US012056034B2

(12) United States Patent
Arveti et al.

(10) Patent No.: US 12,056,034 B2
(45) Date of Patent: Aug. 6, 2024

(54) SYSTEM AND METHOD FOR AUTOMATICALLY MONITORING PERFORMANCE OF SOFTWARE ROBOTS

(71) Applicant: JPMorgan Chase Bank, N.A., New York, NY (US)

(72) Inventors: Sai Arveti, Hyderabad (IN); Harish Peddapati, Rayadurg (IN); Arvind Tejomurtula, Hyderabad (IN); Manas Kumar Behera, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 103 days.

(21) Appl. No.: 17/651,968

(22) Filed: Feb. 22, 2022

(65) Prior Publication Data

US 2023/0222044 A1   Jul. 13, 2023

(30) Foreign Application Priority Data

Jan. 7, 2022   (IN) .............................. 202211000934

(51) Int. Cl.
  *G06F 11/34* (2006.01)
  *G06F 8/65* (2018.01)
  *G06F 9/54* (2006.01)

(52) U.S. Cl.
  CPC ............ *G06F 11/3409* (2013.01); *G06F 8/65* (2013.01); *G06F 9/545* (2013.01)

(58) Field of Classification Search
  CPC ......... G06F 11/3409; G06F 8/65; G06F 9/545
  See application file for complete search history.

(56) References Cited

U.S. PATENT DOCUMENTS

| | | | | |
|---|---|---|---|---|
| 9,588,795 | B2* | 3/2017 | McWilliams | G06F 11/3003 |
| 10,235,264 | B2* | 3/2019 | Goel | G06F 11/3024 |
| 10,250,531 | B2* | 4/2019 | Ray | H04L 51/02 |
| 11,635,953 | B2* | 4/2023 | Crane | G06F 8/65 |
| | | | | 717/171 |
| 2016/0077948 | A1* | 3/2016 | Goel | G06F 11/328 |
| | | | | 714/47.1 |
| 2016/0147550 | A1* | 5/2016 | McWilliams | G06F 9/45558 |
| | | | | 718/1 |
| 2019/0155225 | A1* | 5/2019 | Kothandaraman | G05B 13/041 |

(Continued)

*Primary Examiner* — Matthew J Brophy
(74) *Attorney, Agent, or Firm* — GREENBLUM & BERNSTEIN, P.L.C.

(57) ABSTRACT

Various methods, apparatuses/systems, and media for automatically monitoring performance of multiple bots (software robots) are disclosed. A processor hosts a plurality of bots on a virtual machine, each bot having a unique process identifier on the virtual machine for processing tasks associated with a plurality of applications and each bot having its own configured instance; integrates the plurality of bots with a plurality of data sources via a communication interface; calls corresponding application programming interface (API) to access data from each of the plurality of data sources; integrates all data accessed from each of the plurality of data sources into a single platform; automatically generates, in response to integrating all accessed data, a performance metrics for each bot; and displays the performance metrics onto a graphical user interface (GUI) for constant monitoring of each bot's performance for automatic execution of remedial actions as necessary.

17 Claims, 14 Drawing Sheets

(56) References Cited

U.S. PATENT DOCUMENTS

| | | | |
|---|---|---|---|
| 2019/0332508 A1* | 10/2019 | Goyal | G06F 11/3414 |
| 2020/0065127 A1* | 2/2020 | Kim | G06F 11/3476 |
| 2020/0238514 A1* | 7/2020 | Chinnasamy | G05B 19/042 |
| 2021/0107141 A1* | 4/2021 | Shrivastava | G06F 8/71 |
| 2021/0117302 A1* | 4/2021 | Kadakia | G06F 9/485 |
| 2021/0133078 A1* | 5/2021 | Kunnath | G06F 11/323 |
| 2021/0185007 A1* | 6/2021 | Clapa | H04L 63/20 |
| 2022/0150106 A1* | 5/2022 | McTaggart | H04L 41/5009 |
| 2022/0164701 A1* | 5/2022 | Shrivastava | G06F 21/6218 |
| 2022/0197249 A1* | 6/2022 | Ma | G06F 9/45558 |
| 2022/0300336 A1* | 9/2022 | Major | G06F 9/546 |
| 2023/0143922 A1* | 5/2023 | Cosareanu | G05B 19/0426 718/107 |
| 2023/0236910 A1* | 7/2023 | Marinovici | G06F 40/205 715/234 |

* cited by examiner

FIG. 7

SYSTEM AND METHOD FOR AUTOMATICALLY MONITORING PERFORMANCE OF SOFTWARE ROBOTS

CROSS-REFERENCE TO RELATED APPLICATIONS

This application claims the benefit of priority from Indian Provisional Patent Application No. 202211000934, filed Jan. 7, 2022, which is herein incorporated by reference in its entirety.

TECHNICAL FIELD

This disclosure generally relates to robotic process automation, and, more particularly, to methods and apparatuses for implementing a software robots' (bots) performance monitoring module for automatically monitoring performance of multiple bots and corresponding applications.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Applications typically require infrastructure resources such as servers, databases, load balancers, message queues, storages etc. in order to function. Typically, these infrastructure resources need to be provided at the time of application startup. Modern applications may need to access a number of infrastructure resources in order to provide useful functionality. For example, due to a limitation in the number of concurrent interactive sessions that are permitted per virtual server, executing bots may require a large number of virtual servers because of their dependency on interactive windows sessions. Typically, a robotics team for a large organization such JPMorgan and Chase has over eight hundreds production instances, deployed across over five hundreds virtual servers supporting over fifty unique business process automations, and more were being added monthly to keep up with the demand. These automations (i.e., bots) may handle processing of approximately three million transactions on a monthly basis. Moreover, each bot may consist of several (functional identifiers) FIDs that are used to login to applications during a workflow. Managing FIDs for all bots is a challenging task as they span across multiple platforms and can be more than twenty five hundred accounts in number. From observability standpoint, it may prove to be extremely challenging to get a holistic view of how each of these bots are performing against the service levels. Existing monitoring solutions were inefficient, consuming at least thirty minutes per bot for monitoring each time, thereby making system performance inefficient.

Thus, there is a need for an advanced tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a bots' performance monitoring module configured with live telemetry features for providing detailed view of metrics with which performance of each bot could be easily assessed, but the disclosure is not limited thereto.

For example, the present disclosure, through one or more of its various aspects, embodiments, and/or specific features or sub-components, provides, among other features, various systems, servers, devices, methods, media, programs, and platforms for implementing a bots' performance monitoring module that may be configured to provide a single platform (e.g., performing as a one stop solution) to monitor the following metrics: bot metrics related to, e.g., straight through processing (STP), average handle time (AHT), active vs. configured instances, volume processed, data loading, etc.; infra metrics related to, e.g., central processing unit (CPU), memory, disk utilization, applications installed with versions with actionable features to trigger automation-as-a-service (AAAS) for start or stop or restart of services, reboot operating system (OS), disk cleanup, etc.; FID related metrics, e.g., account health, password sync status, FID login failures with actionable features to trigger password reset on-demand and password management team engagement using SNOW (Service Now) application programming interface (API), etc.; application level monitoring, e.g., status of applications, APIs, Web-links, latency and failure rate with actionable features to trigger AAAS for application upgrades and application team engagement using SNOW API, etc.; cloud metrics monitoring, e.g., pool status, cloud components status, performance metrics of the component with actionable features to trigger AAAS for start or stop or restart cloud components and cloud team engagement using SNOW API, etc., but the disclosure is not limited thereto. For example, according to an aspect of the present disclosure, the bots' performance monitoring module may be configured to collect data from a plurality of observability platforms to execute automated decision-making processes to improve system performance.

According to an aspect of the present disclosure, a method for automatically monitoring performance of multiple bots by utilizing one or more processors and one or more memories is disclosed. The method may include: hosting a plurality of bots on a virtual machine, each bot having a unique process identifier on the virtual machine for processing tasks associated with a plurality of applications and each bot having its own configured instance; integrating the plurality of bots with a plurality of data sources via a communication interface; calling corresponding API to access data from each of the plurality of data sources; integrating all data accessed from each of the plurality of data sources into a single platform; automatically generating, in response to integrating all accessed data, a performance metrics for each bot; and displaying the performance metrics onto a graphical user interface (GUI) for constant monitoring of each bot's performance for automatic execution of remedial actions as necessary.

According to an additional aspect of the present disclosure, the virtual machine may be a server or a database, and each bot may share a common database, but the disclosure is not limited thereto.

According to a further aspect of the present disclosure, the plurality of data sources may include one or more of the following data sources: a data source for obtaining robotic process automation (RPA) data; a data source for obtaining information data related to exact location of a server that hosts a certain bot; a data source for obtaining infra metrics data; a data source for obtaining data related to what kind data feed each bot is receiving; an active directory to obtain data related to status of each data feed; a data source for obtaining log data associated with data processed by each bot; and data source for obtaining cloud components associated with each bot, but the disclosure is not limited thereto.

According to a yet another aspect of the present disclosure, the infra metrics data may include one or more of the following data: CPU capacity, memory capacity, disk utilization, applications installed with versions with actionable features to trigger AAAS for start or stop or restart of services, reboot OS and disk cleanup, but the disclosure is not limited thereto.

According to an aspect of the instant disclosure, the method may further include: automatically generating and displaying STP data that defines a percentage of volume each bot completed for a given volume in a time period.

According to a further aspect of the instant disclosure, the method may further include: automatically generating and displaying an AHT data that defines an average time taken by a certain bot to handle each instance.

According to an additional aspect of the instant disclosure, the method may further include: hyperlinking each bot to its own live telemetry dashboard where each metric is displayed in graphical and tabular formats with historical information available for troubleshooting purposes.

According to yet another aspect of the instant disclosure, the method may further include: automatically generating and displaying application level metrics data related to status of applications, APIs, Web-links, latency and failure rate with actionable features to trigger AAAS for application upgrades and application team engagement using service now API.

According to yet another aspect of the instant disclosure, the method may further include: automatically generating and displaying cloud metrics data related to pool status, cloud components status, performance metrics of the component with actionable features to trigger AAAS for start or stop or restart cloud components and cloud team engagement using service now API.

According to a further aspect of the instant disclosure, the method may further include: automatically generating and displaying FID metrics data related account health, password sync status, FID login failures with actionable features to trigger password reset on-demand and password management team engagement using service now API.

According to another aspect of the instant disclosure, a system for automatically monitoring performance of multiple bots is disclosed. The system may include: a processor; and a memory operatively connected to the processor via a communication interface, the memory storing computer readable instructions, when executed, may cause the processor to: host a plurality of bots on a virtual machine, each bot having a unique process identifier on the virtual machine for processing tasks associated with a plurality of applications and each bot having its own configured instance; integrate the plurality of bots with a plurality of data sources via a communication interface; call corresponding application programming interface (API) to access data from each of the plurality of data sources; integrate all data accessed from each of the plurality of data sources into a single platform; automatically generate, in response to integrating all accessed data, a performance metrics for each bot; and display the performance metrics onto a graphical user interface (GUI) for constant monitoring of each bot's performance for automatic execution of remedial actions as necessary.

According to an aspect of the instant disclosure, the processor may be further configured to: automatically generate and display STP data that defines a percentage of volume each bot completed for a given volume in a time period.

According to a further aspect of the instant disclosure, the processor may be further configured to: automatically generate and display an AHT data that defines an average time taken by a certain bot to handle each instance.

According to an additional aspect of the instant disclosure, the processor may be further configured to: hyperlink each bot to its own live telemetry dashboard where each metric is displayed in graphical and tabular formats with historical information available for troubleshooting purposes.

According to yet another aspect of the instant disclosure, the processor may be further configured to: automatically generate and display application level metrics data related to status of applications, APIs, Web-links, latency and failure rate with actionable features to trigger AAAS for application upgrades and application team engagement using service now API.

According to yet another aspect of the instant disclosure, the processor may be further configured to: automatically generate and display cloud metrics data related to pool status, cloud components status, performance metrics of the component with actionable features to trigger AAAS for start or stop or restart cloud components and cloud team engagement using service now API.

According to a further aspect of the instant disclosure, the processor may be further configured to: automatically generate and display FID metrics data related account health, password sync status, FID login failures with actionable features to trigger password reset on-demand and password management team engagement using service now API.

According to yet another aspect of the present disclosure, a non-transitory computer readable medium configured to store instructions for automatically monitoring performance of multiple bots is disclosed. The instructions, when executed, may cause a processor to perform the following: hosting a plurality of bots on a virtual machine, each bot having a unique process identifier on the virtual machine for processing tasks associated with a plurality of applications and each bot having its own configured instance; integrating the plurality of bots with a plurality of data sources via a communication interface; calling corresponding API to access data from each of the plurality of data sources; integrating all data accessed from each of the plurality of data sources into a single platform; automatically generating, in response to integrating all accessed data, a performance metrics for each bot; and displaying the performance metrics onto a graphical user interface (GUI) for constant monitoring of each bot's performance for automatic execution of remedial actions as necessary.

According to an aspect of the instant disclosure, the instructions, when executed, may cause the processor to further perform the following: automatically generating and displaying STP data that defines a percentage of volume each bot completed for a given volume in a time period.

According to a further aspect of the instant disclosure, the instructions, when executed, may cause the processor to further perform the following: automatically generating and displaying an AHT data that defines an average time taken by a certain bot to handle each instance.

According to an additional aspect of the instant disclosure, the instructions, when executed, may cause the processor to further perform the following: hyperlinking each bot to its own live telemetry dashboard where each metric is displayed in graphical and tabular formats with historical information available for troubleshooting purposes.

According to yet another aspect of the instant disclosure, the instructions, when executed, may cause the processor to further perform the following: automatically generating and displaying application level metrics data related to status of applications, APIs, Web-links, latency and failure rate with actionable features to trigger AAAS for application upgrades and application team engagement using service now API.

According to yet another aspect of the instant disclosure, the instructions, when executed, may cause the processor to further perform the following: automatically generating and displaying cloud metrics data related to pool status, cloud components status, performance metrics of the component with actionable features to trigger AAAS for start or stop or restart cloud components and cloud team engagement using service now API.

According to a further aspect of the instant disclosure, the instructions, when executed, may cause the processor to further perform the following: automatically generating and displaying FID metrics data related account health, password sync status, FID login failures with actionable features to trigger password reset on-demand and password management team engagement using service now API.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 7 illustrates an exemplary screen shot displaying instance trend of multiple bots in accordance with an exemplary embodiment.

DETAILED DESCRIPTION

Figure 1:
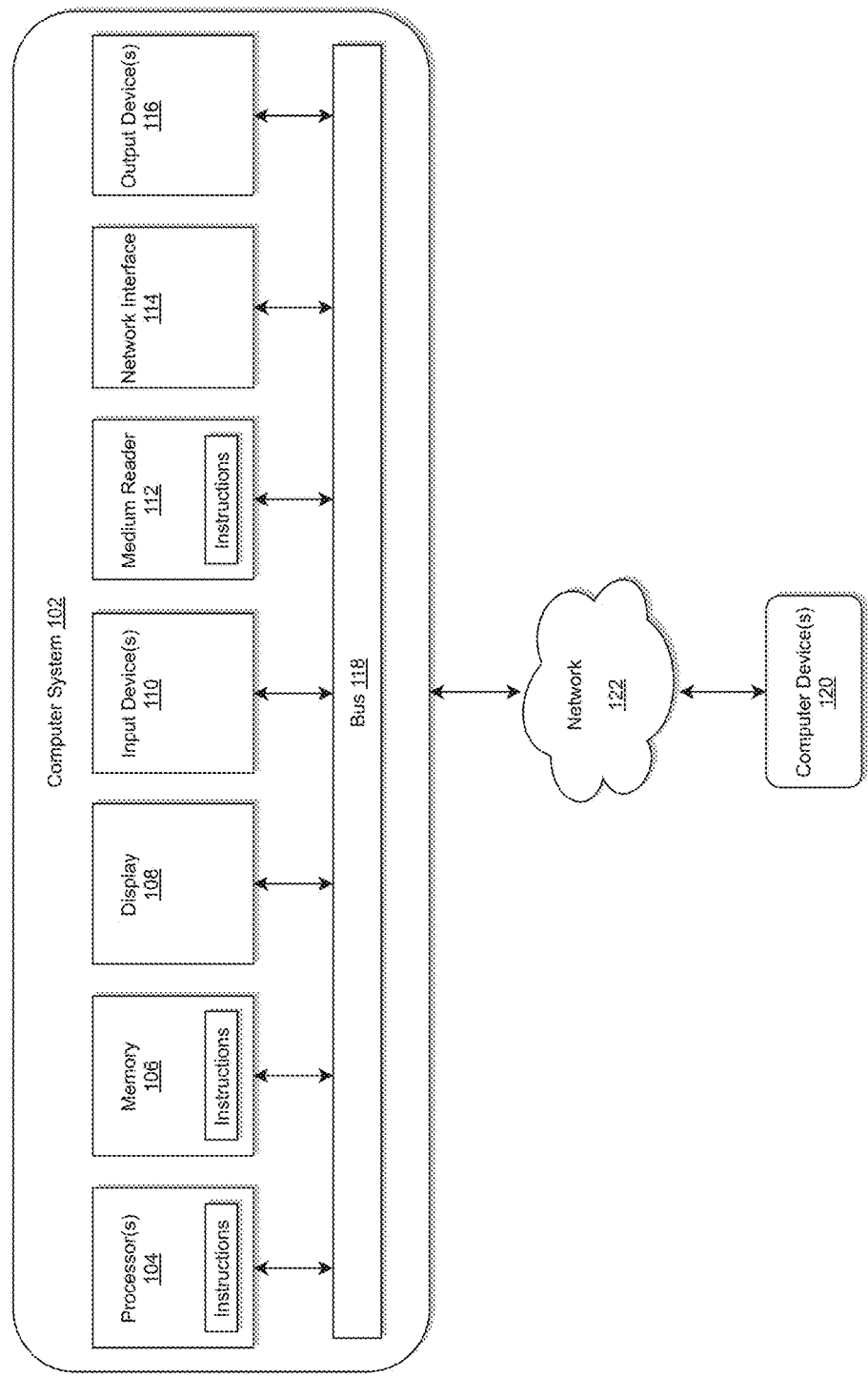
FIG. 1 illustrates a computer system for implementing a bots' performance monitoring module configured with live telemetry features for providing detailed view of metrics with which performance of each bot could be easily assessed in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a bots' performance monitoring module configured with live telemetry features for providing detailed view of metrics with which performance of each bot could be easily assessed in accordance with the embodiments described herein, but the disclosure is not limited thereto. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
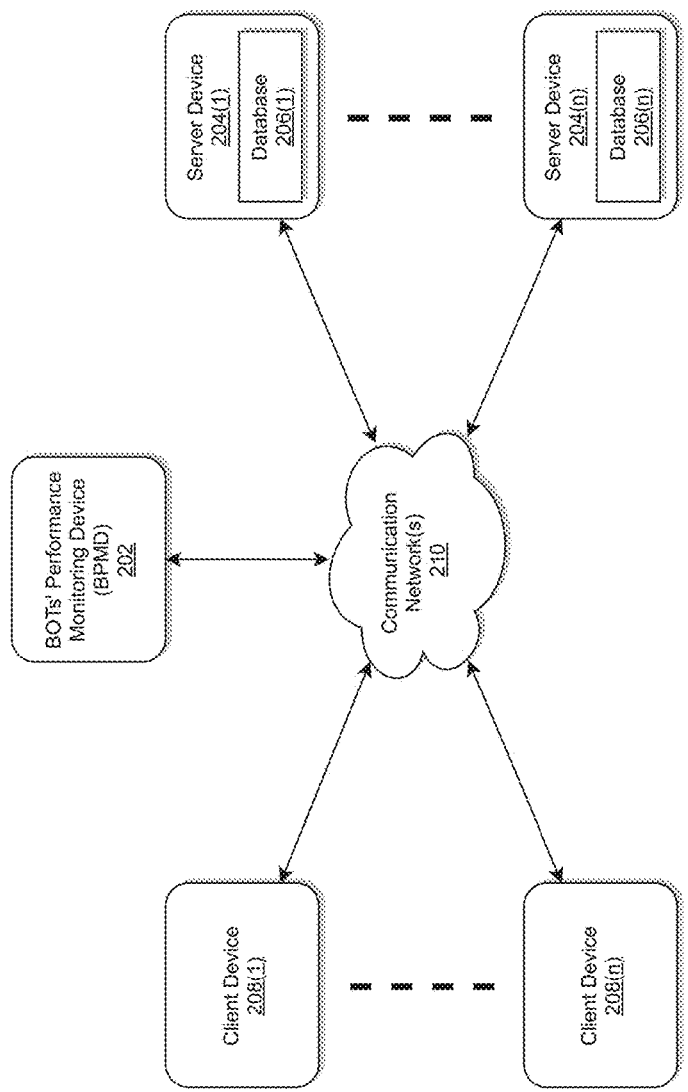
FIG. 2 illustrates an exemplary diagram of a network environment with a bots' performance monitoring device in accordance with an exemplary embodiment.

Referring to FIG. 2, a schematic of an exemplary network environment 200 for implementing a bots' performance monitoring device (BPMD) of the instant disclosure is illustrated.

According to exemplary embodiments, the above-described problems associated with conventional robotic automation tools may be overcome by implementing a BPMD 202 as illustrated in FIG. 2 that may implement a bots' performance monitoring module configured with live telemetry features for providing detailed view of metrics with which performance of each bot could be easily assessed, but the disclosure is not limited thereto. For example, the present disclosure, through one or more of its various aspects, embodiments, and/or specific features or sub-components, provides, among other features, various systems, servers, devices, methods, media, programs, and platforms for implementing that BPMD 202 as illustrated in FIG. 2 that may implement a bots' performance monitoring module that may be configured to provide a single platform (e.g., performing as a one stop solution) to monitor the following metrics: bot metrics related to, e.g., STP, AHT, active vs. configured instances, volume processed, data loading, etc.; infra metrics related to, e.g., CPU, memory, disk utilization, applications installed with versions with actionable features to trigger AAAS for start or stop or restart of services, reboot OS, disk cleanup, etc.; FID related metrics, e.g., account health, password sync status, FID login failures with actionable features to trigger password reset on-demand and password management team engagement using SNOW API, etc.; application level monitoring, e.g., status of applications, APIs, Web-links, latency and failure rate with actionable features to trigger AAAS for application upgrades and application team engagement using SNOW API, etc.; cloud metrics monitoring, e.g., pool status, cloud components status, performance metrics of the component with actionable features to trigger AAAS for start or stop or restart cloud components and cloud team engagement using SNOW API, etc., but the disclosure is not limited thereto. For example, according to exemplary embodiments, the bots' performance monitoring module within the BMPD 402 may be configured to collect data from a plurality of observability platforms to execute automated decision-making processes to improve system performance.

The BPMD 202 may be the same or similar to the computer system 102 as described with respect to FIG. 1.

The BPMD 202 may store one or more applications that can include executable instructions that, when executed by the BPMD 202, cause the BPMD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the BPMD 202 itself, may be located in virtual server(s) running in a cloud-based computing environment rather than being tied to one or more specific physical network computing devices. Also, the application(s) may be running in one or more virtual machines (VMs) executing on the BPMD 202. Additionally, in one or more embodiments of this technology, virtual machine(s) running on the BPMD 202 may be managed or supervised by a hypervisor.

In the network environment 200 of FIG. 2, the BPMD 202 is coupled to a plurality of server devices 204(1)-204(n) that hosts a plurality of databases 206(1)-206(n), and also to a plurality of client devices 208(1)-208(n) via communication network(s) 210. A communication interface of the BPMD 202, such as the network interface 114 of the computer system 102 of FIG. 1, operatively couples and communicates between the BPMD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the BPMD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The BPMD 202 may be a standalone device or integrated with one or more other devices or apparatuses, such as one or more of the server devices 204(1)-204(n), for example. In one particular example, the BPMD 202 may be hosted by one of the server devices 204(1)-204(n), and other arrangements are also possible. Moreover, one or more of the devices of the BPMD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the BPMD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the BPMD 202 as illustrated in FIG. 2 that may implement a bots' performance monitoring module configured with live telemetry features for providing detailed view of metrics with which performance of each bot could be easily assessed, but the disclosure is not limited thereto. For example, according to exemplary embodiments, the client devices 208(1)-208(n) in this example may include any type of computing device that can facilitate the implementation of the BPMD 202 as illustrated in FIG. 2 that BPMD 202 that may implement a bots' performance monitoring module that may be configured to provide a single platform (e.g., performing as a one stop solution) to monitor the following metrics: bot metrics related to, e.g., STP, AHT, active vs. configured instances, volume processed, data loading, etc.; infra metrics related to, e.g., CPU, memory, disk utilization, applications installed with versions with actionable features to trigger AAAS for start or stop or restart of services, reboot OS, disk cleanup, etc.; FID related metrics, e.g., account health, password sync status, FID login failures with actionable features to trigger password reset on-demand and password management team engagement using SNOW API, etc.; application level monitoring, e.g., status of applications, APIs, Web-links, latency and failure rate with actionable features to trigger AAAS for application upgrades and application team engagement using SNOW API, etc.; cloud metrics monitoring, e.g., pool status, cloud components status, performance metrics of the component with actionable features to trigger AAAS for start or stop or restart cloud components and cloud team engagement using SNOW API, etc., but the disclosure is not limited thereto. For example, according to exemplary embodiments, the bots' performance monitoring module implemented by the client devices 208(1)-208(n) within the BMPD 402 may be configured to collect data from a plurality of observability platforms to execute automated decision-making processes to improve system performance.

The client devices 208(1)-208(n) may run interface applications, such as standard web browsers or standalone client applications, which may provide an interface to communicate with the BPMD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the BPMD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the BPMD 202, the server devices 204(1)-204(n), or the client devices 208(1)-208(n), for example, may be configured to operate as virtual instances on the same physical machine. For example, one or more of the BPMD 202, the server devices 204(1)-204(n), or the client devices 208(1)-208(n) may operate on the same physical device rather than as separate devices communicating through communication network(s) 210. Additionally, there may be more or fewer BPMDs 202, server devices 204(1)-204(n), or client devices 208(1)-208(n) than illustrated in FIG. 2. According to exemplary embodiments, the BPMD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
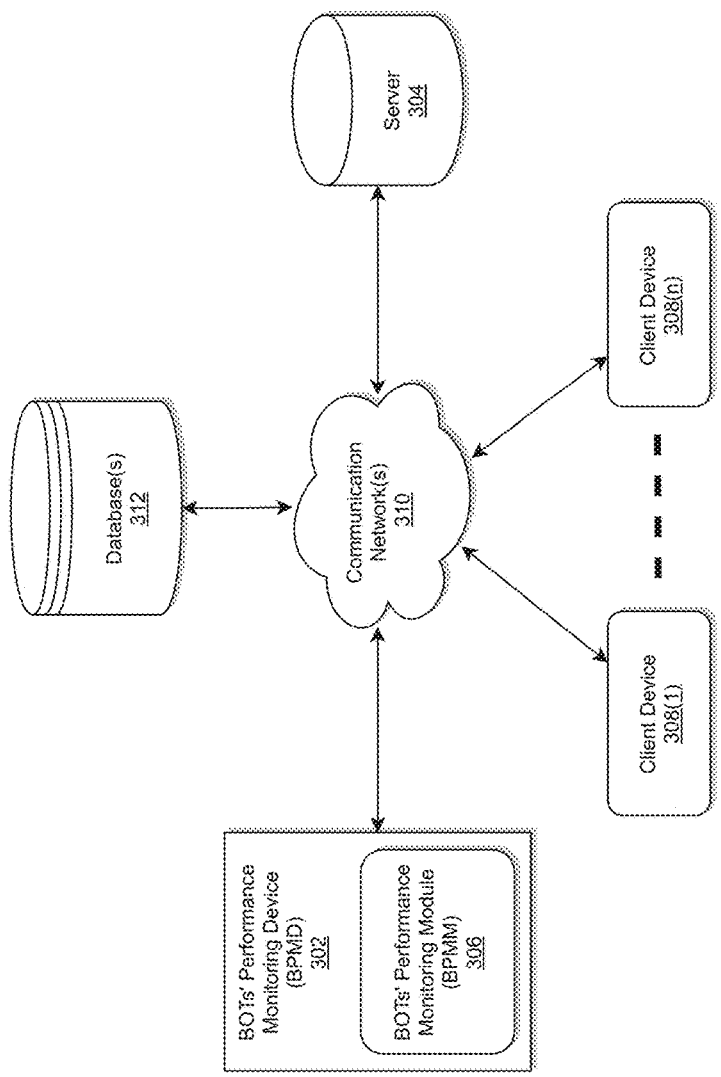
FIG. 3 illustrates a system diagram for implementing a bots' performance monitoring device having a bots' performance monitoring module in accordance with an exemplary embodiment.

FIG. 3 illustrates a system diagram for implementing a platform and language agnostic bots' performance monitoring device (BPMD) having a platform and language agnostic bots' performance monitoring module (BPMM) in accordance with an exemplary embodiment.

As illustrated in FIG. 3, the system 300 may include a BPMD 302 within which a BPMM 306 is embedded, a server 304, a database(s) 312, a plurality of client devices 308(1) . . . 308(n), and a communication network 310. The database(s) 312 may be also referred to as a configuration and log database.

According to exemplary embodiments, the BPMD 302 including the BPMM 306 may be connected to the server 304, and the database(s) 312 via the communication network 310. The BPMD 302 may also be connected to the plurality of client devices 308(1) . . . 308(n) via the communication network 310, but the disclosure is not limited thereto. The client devices 308(1) . . . 308(n) may be the same or similar to the client devices 208(1) . . . 208(n)

According to exemplary embodiment, the BPMD 302 is described and shown in FIG. 3 as including the BPMM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein.

According to exemplary embodiments, the BPMM 306 may be configured to receive real-time feed of data from the plurality of client devices 308(1) . . . 308(n) via the communication network 310.

As will be described below, the BPMM 306 may be configured for hosting a plurality of bots on a virtual machine, each bot having a unique process identifier on the virtual machine (e.g., server 304) for processing tasks associated with a plurality of applications and each bot having its own configured instance; integrating the plurality of bots with a plurality of data sources (e.g., databases 312) via a communication interface (e.g., communication network 310); calling corresponding API to access data from each of the plurality of data sources (e.g., databases 312); integrating all data accessed from each of the plurality of data sources (e.g., databases 312) into a single platform; automatically generating, in response to integrating all accessed data, a performance metrics for each bot; and displaying the performance metrics onto a graphical user interface (GUI) for constant monitoring of each bot's performance for automatic execution of remedial actions as necessary, but the disclosure is not limited thereto.

The plurality of client devices 308(1) . . . 308(n) are illustrated as being in communication with the BPMD 302. In this regard, the plurality of client devices 308(1) . . . 308(n) may be "clients" of the BPMD 302 and are described herein as such. Nevertheless, it is to be known and understood that the plurality of client devices 308(1) . . . 308(n) need not necessarily be "clients" of the BPMD 302, or any entity described in association therewith herein. Any additional or alternative relationship may exist between either or both of the plurality of client devices 308(1) . . . 308(n) and the BPMD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the BPMD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The BPMD 302 may be the same or similar to the BPMD 202 as described with respect to FIG. 2, including any features or combination of features described with respect thereto.

Figure 4:
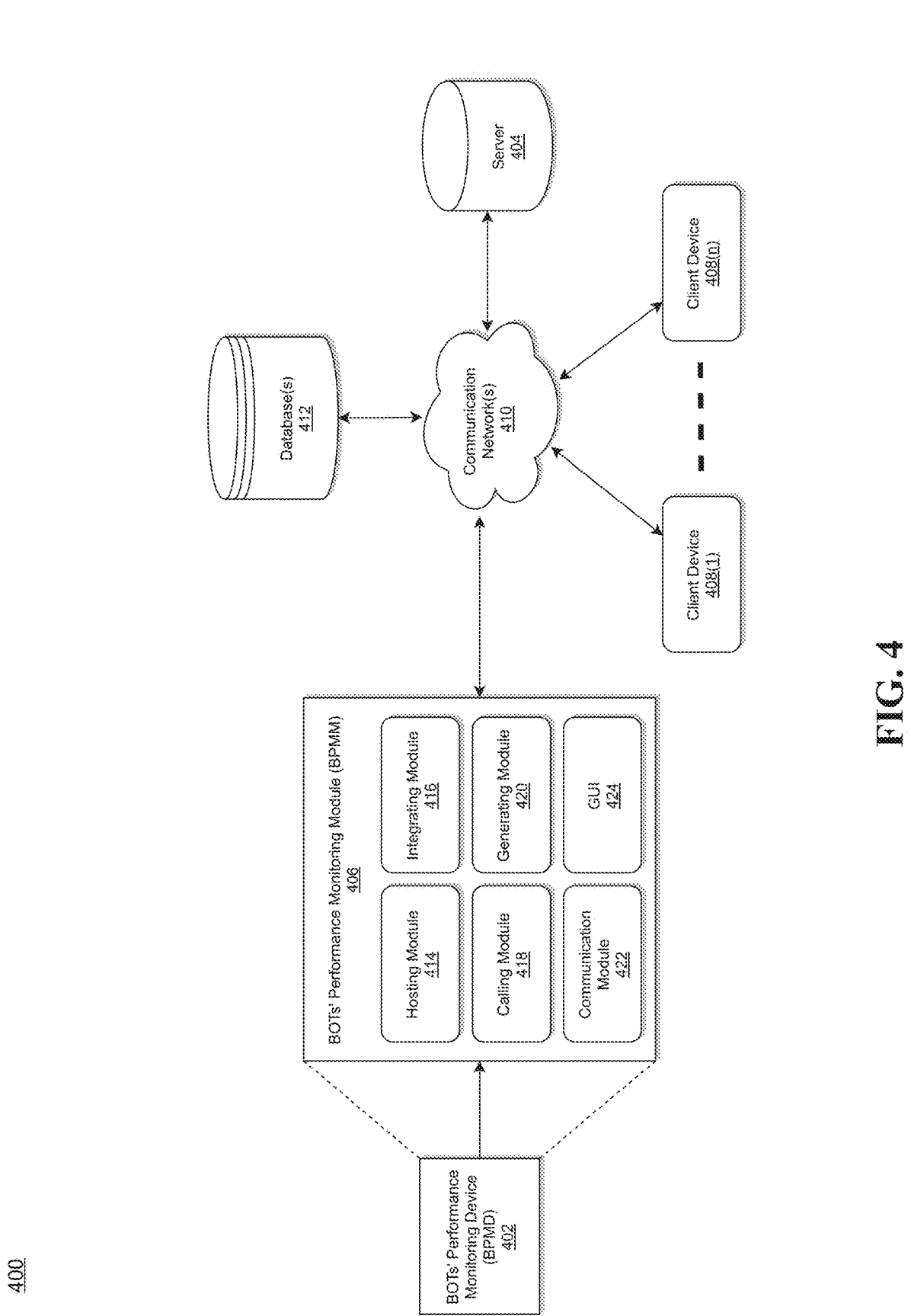
FIG. 4 illustrates a system diagram for implementing a bots' performance monitoring module of FIG. 3 in accordance with an exemplary embodiment.

FIG. 4 illustrates a system diagram for implementing a platform and language agnostic BPMM of FIG. 3 in accordance with an exemplary embodiment.

According to exemplary embodiments, the system 400 may include a platform and language agnostic BPMD 402 within which a BPMM 406 is embedded, a server 404, database(s) 412, and a communication network 410.

According to exemplary embodiments, the BPMD 402 including the BPMM 406 may be connected to the server 404 and the database(s) 412 via the communication network 410. The BPMD 402 may also be connected to the plurality of client devices 408(1)-408(n) via the communication network 410, but the disclosure is not limited thereto. The BPMM 406, the server 404, the plurality of client devices 408(1)-408(n), the database(s) 412, the communication network 410 as illustrated in FIG. 4 may be the same or similar to the BPMM 306, the server 304, the plurality of client devices 308(1)-308(n), the database(s) 312, the communication network 310, respectively, as illustrated in FIG. 3.

According to exemplary embodiments, as illustrated in FIG. 4, the BPMM 406 may include a hosting module 414, an integrating module 416, a calling module 418, a generating module 420, a communication module 422, and a GUI 424.

According to exemplary embodiments, each of the hosting module 414, integrating module 416, calling module 418, generating module 420, and the communication module 422 of the BPMM 406 as illustrated in FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the hosting module 414, integrating module 416, calling module 418, generating module 420, and the communication module 422 of the BPMM 406 as illustrated in FIG. 4 may be implemented by microprocessors or similar, and may be programmed using software (e.g., microcode) to perform various functions discussed herein and may optionally be driven by firmware and/or software.

Alternatively, according to exemplary embodiments, each of the hosting module 414, integrating module 416, calling module 418, generating module 420, and the communication module 422 of the BPMM 406 as illustrated in FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the hosting module 414, integrating module 416, calling module 418, generating module 420, and the communication module 422 of the BPMM 406 as illustrated in FIG. 4 may be called via corresponding API.

The process may be executed via the communication module 422 and the communication network 410, which may comprise plural networks as described above. For example, in an exemplary embodiment, the various components of the BPMM 406 may communicate with the server 404, and the database(s) 412 via the communication module 422 and the communication network 410. Of course, these embodiments are merely exemplary and are not limiting or exhaustive.

According to exemplary embodiments, the communication network 410 and the communication module 422 may be configured to establish a link between the database(s) 412, the client devices 408(1)-408(n) and the BPMM 406.

FIGS. 9A, 9B, 9C, 9D, and 9E, in combination, illustrates an exemplary architecture 900 implemented by the BPMM 406 of FIG. 4 in accordance with an exemplary embodiment. Although in FIGS. 9A-9E, RPA bots 902 are illustrated, the disclosure is not limited to RPA bots only. The BPMM 406 can be configured to monitor any other desired bots.

Figure 9A:
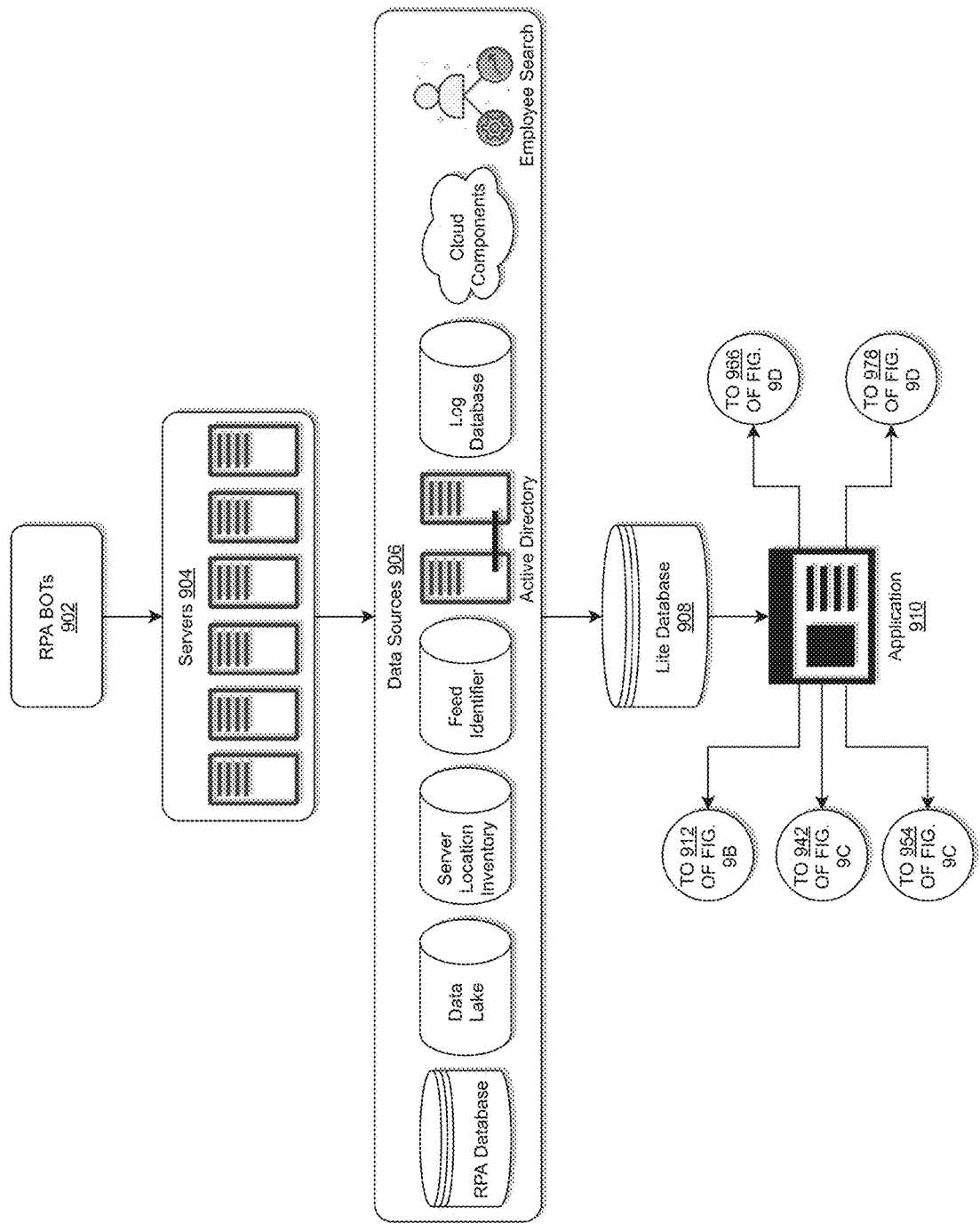
FIGS. 9A, 9B, 9C, 9D, and 9E, in combination, illustrates an exemplary architecture implemented by a bots' performance monitoring module of FIG. 4 in accordance with an exemplary embodiment.

As illustrated in FIG. 9A, the RPA bots 902 may be hosted to servers 904. The servers 904 may be operatively connected to a plurality of data sources 906 that may include, but not limited thereto, an RPA database, a data lake (i.e., Satori), a server location inventory database (i.e., GetHost), a feed identifier database (i.e., VST), active directory, a log database (i.e., Splunk), cloud components, user (i.e., employee) search data sources, etc., but the disclosure is not limited thereto. The plurality of data sources 906 may be operatively connected to a lite database 908 (SQ lite database) which may be operatively connected to the application 910. According to exemplary embodiments, the application 910 may host the BPMM 406 is illustrated in FIG. 4.

Referring to FIGS. 4 and 9A, according to exemplary embodiments, the hosting module 414 may be configured to host a plurality of bots 902 on a virtual machine (i.e., servers 404, 904), each bot having a unique process identifier on the virtual machine (i.e., servers 404, 904) for processing tasks associated with a plurality of applications and each bot having its own configured instance.

According to exemplary embodiments, the integrating module 416 may be configured to integrate the plurality of bots 902 with the plurality of data sources 906 via a communication interface (i.e., communication module 422 and the communication network(s) 410).

According to exemplary embodiments, the calling module 418 may be configured to call corresponding API to access data from each of the plurality of data sources 906. The integrating module 416 may be configured to integrate all data accessed from each of the plurality of data sources 906 into a single platform (i.e., the application 910). The generating module 420 may be configured to automatically generate, in response to integrating all accessed data, a performance metrics for each bot 902; and display the performance metrics onto the GUI 424 for constant monitoring of each bot's 902 performance for automatic execution of remedial actions as necessary.

Figure 5:
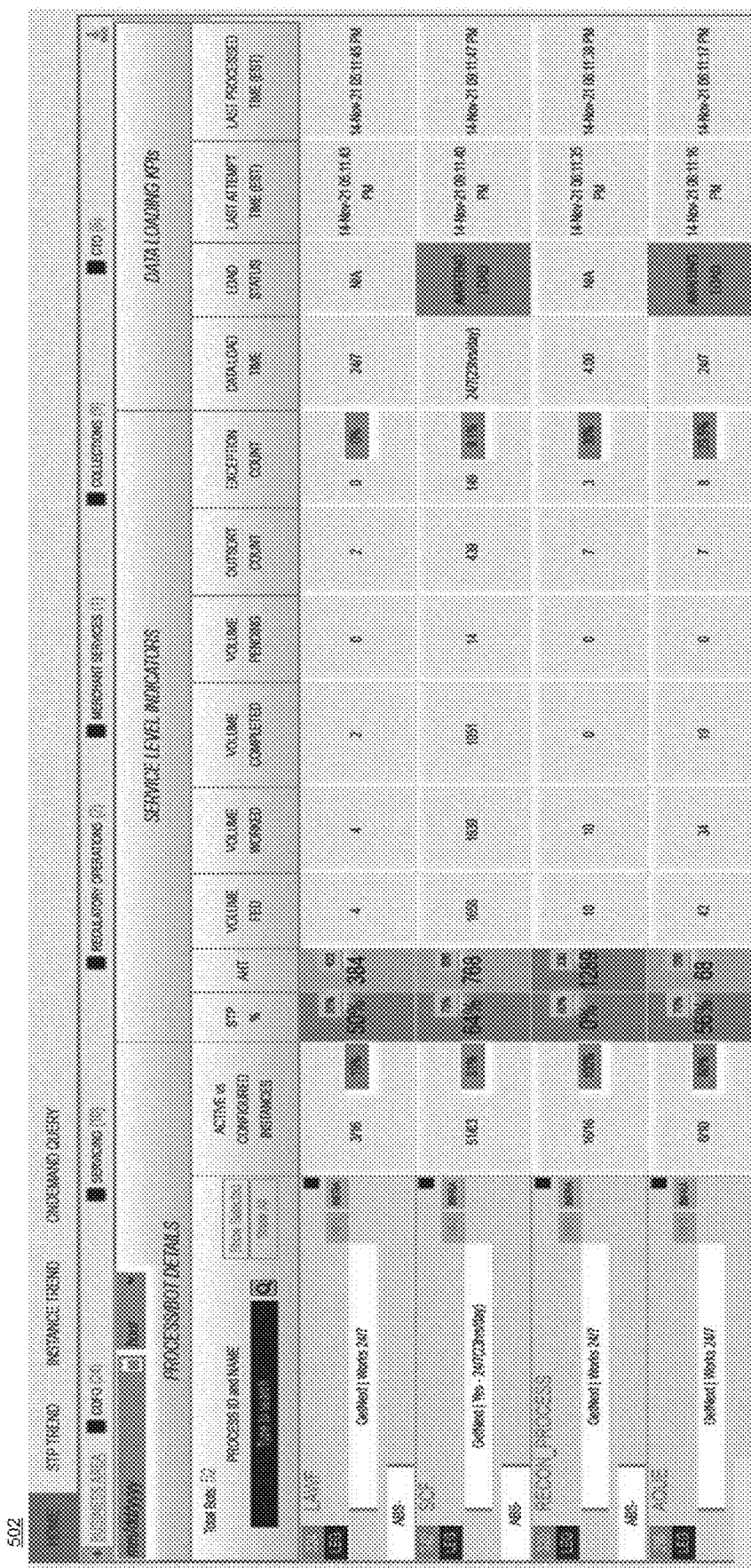
FIG. 5 illustrates an exemplary screen shot displaying listing of multiple in accordance with an exemplary embodiment.
Figure 6:
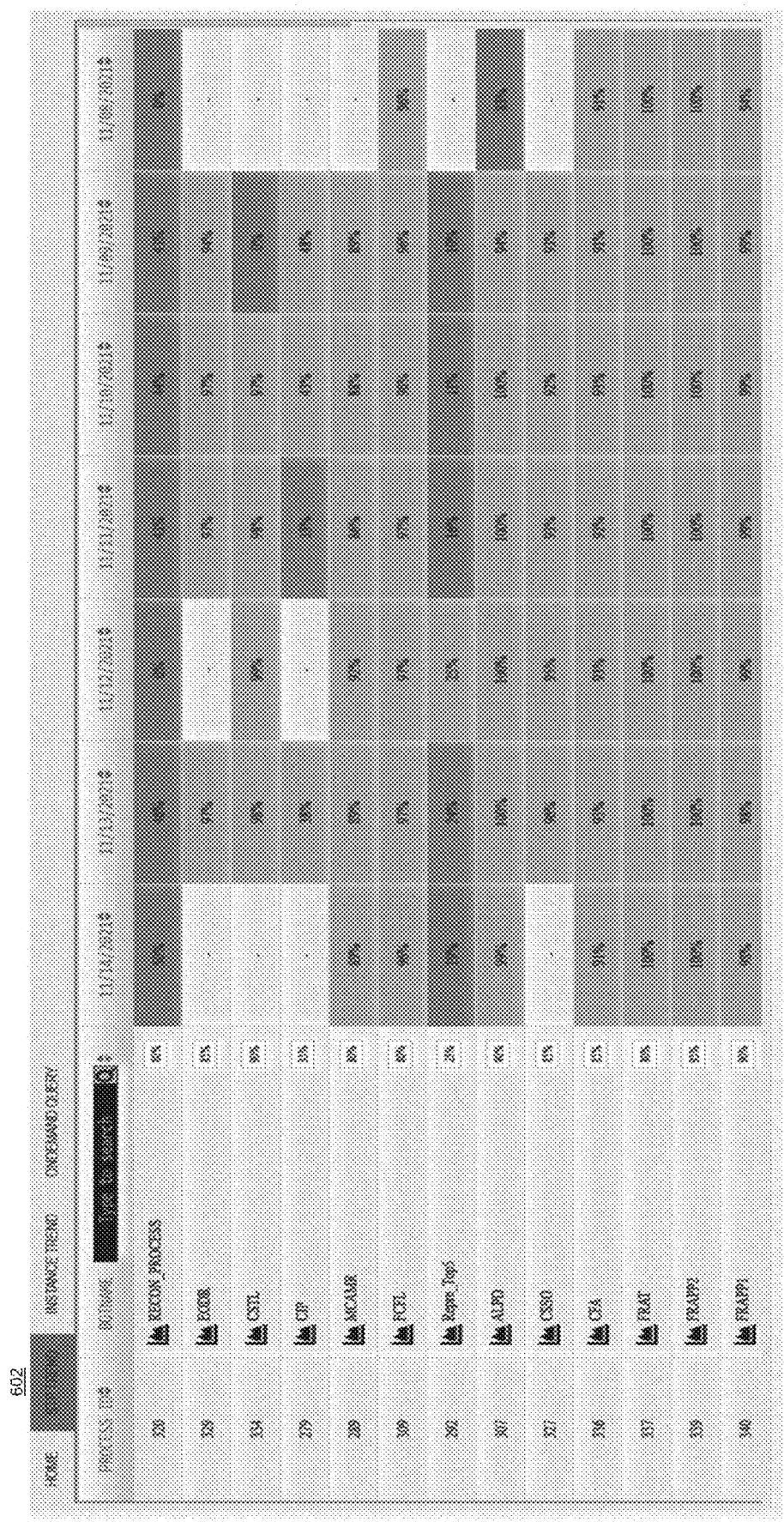
FIG. 6 illustrates an exemplary screen shot displaying STP trend of multiple bots in accordance with an exemplary embodiment.
Figure 7:
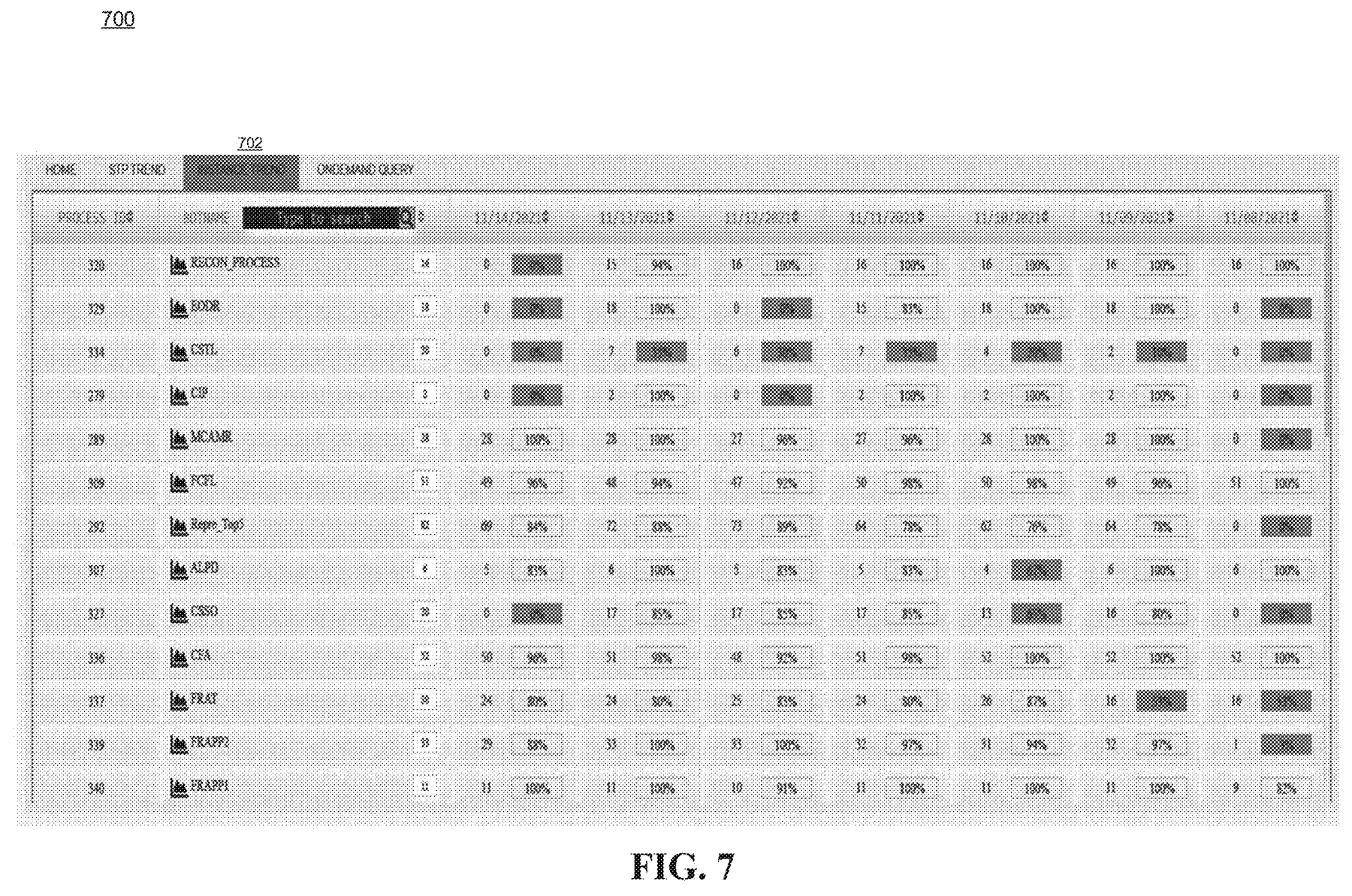
Figure 8:
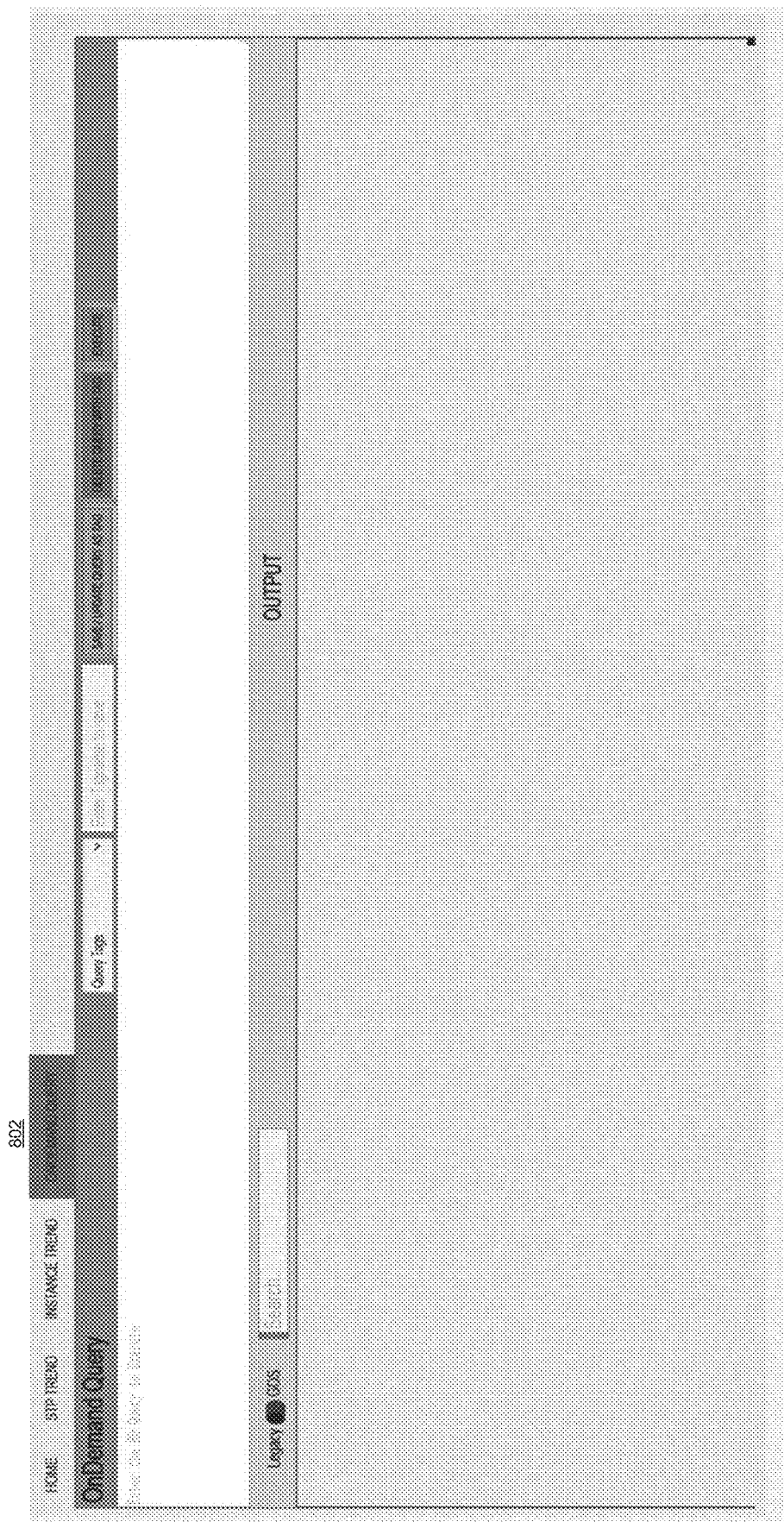
FIG. 8 illustrates an exemplary screen shot of receiving user input regarding on-demand query in accordance with an exemplary embodiment.

For example, FIG. 5 illustrates an exemplary screen shot 500 displaying listing of multiple bots 902 in accordance with an exemplary embodiment. FIG. 6 illustrates an exemplary screen shot 600 displaying STP trend of the multiple bots 902 in accordance with an exemplary embodiment. FIG. 7 illustrates an exemplary screen shot 700 displaying instance trend of the multiple bots 902 in accordance with an exemplary embodiment. FIG. 8 illustrates an exemplary screen shot 800 of receiving user input regarding on-demand query in accordance with an exemplary embodiment.

According to exemplary embodiments, the virtual machine may be a server or a database, and each bot may share a common database (i.e., server 404, 904), but the disclosure is not limited thereto.

According to exemplary embodiments, the plurality of data sources may include one or more of the following data sources: a data source for obtaining robotic process automation (RPA) data; a data source for obtaining information data related to exact location of a server that hosts a certain bot; a data source for obtaining infra metrics data; a data source for obtaining data related to what kind data feed each bot is receiving; an active directory to obtain data related to status of each data feed; a data source for obtaining log data associated with data processed by each bot; and data source for obtaining cloud components associated with each bot, but the disclosure is not limited thereto.

Figure 9B:
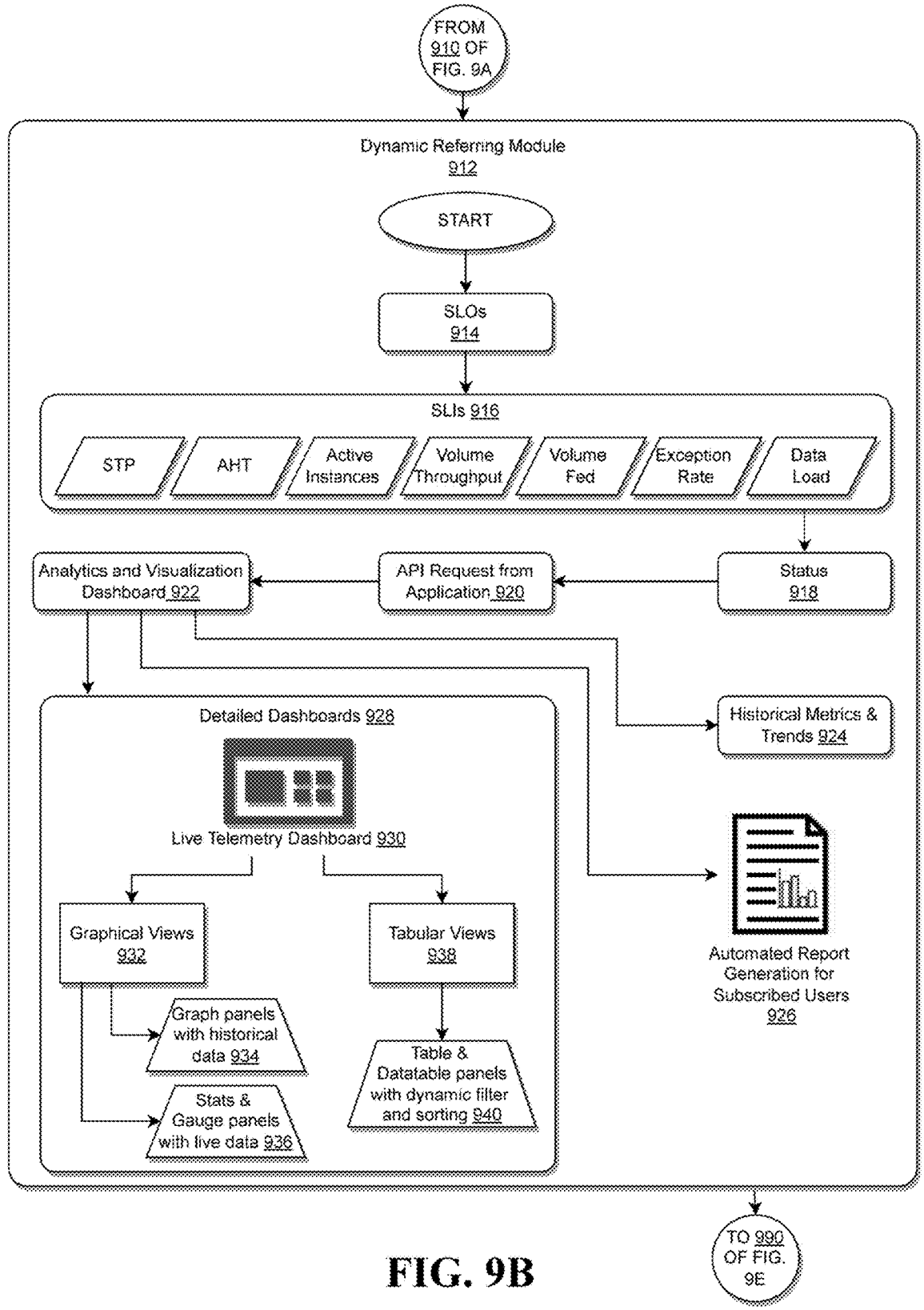

For example, FIG. 9B illustrates the architecture diagram 900 implemented by the BPMM 406 of FIG. 4. As illustrated in FIG. 9B, a dynamic referring module 912 implemented by the BPMM 406 may illustrate a flow of data from service level objects (SLOs) 914 to service level indicators (SLIs 916). The SLIs 916 may include STP, AHT, active instances, volume throughput, volume fed, exception rate, and data load, but the disclosure is not limited thereto.

According to exemplary embodiments, the BPMM 406 may automatically generate and display STP data that defines a percentage of volume each bot 902 completed for a given volume in a time period.

According to exemplary embodiments, the BPMM 406 may automatically generate and display an AHT data that defines an average time taken by a certain bot 902 to handle each instance.

As illustrated in FIG. 9B, data from the SLIs 916 may flow to a status block 918. Data from the status block 918 may flow to API request from application (i.e., application 910 as illustrated in FIG. 9A) block 920. Data from the API request from application block 920 may flow to an analytics and visualization dashboard 922. Data from the analytics and visualization dashboard 922 may be utilized to generate historical metrics and trends data 924, an automated report for subscribed users 926. The data from the analytics and visualization dashboard 922 may be utilized by detailed dashboards 928 that includes the live telemetry dashboard 930. The live telemetry dashboard 930 may display graphical view 932, tabular views 938. The graphical views 932 may include graph panels with historical data 934 and statistics and gauge panels with live data 936. The tabular view 938 may include table and database panels with dynamic filter and sorting 940.

For example, according to exemplary embodiments, the BPMM 406 may be configured to hyperlink each bot 902 to its own live telemetry dashboard 930 where each metric is displayed in graphical (graphical views 932) and tabular (tabular views 938) formats with historical information available for troubleshooting purposes.

According to exemplary embodiments, the infra metrics data may include one or more of the following data: CPU capacity, memory capacity, disk utilization, applications installed with versions with actionable features to trigger AAAS for start or stop or restart of services, reboot OS and disk cleanup, but the disclosure is not limited thereto (see, e.g., FIG. 9C, infra observability flow 942).

Figure 9C:
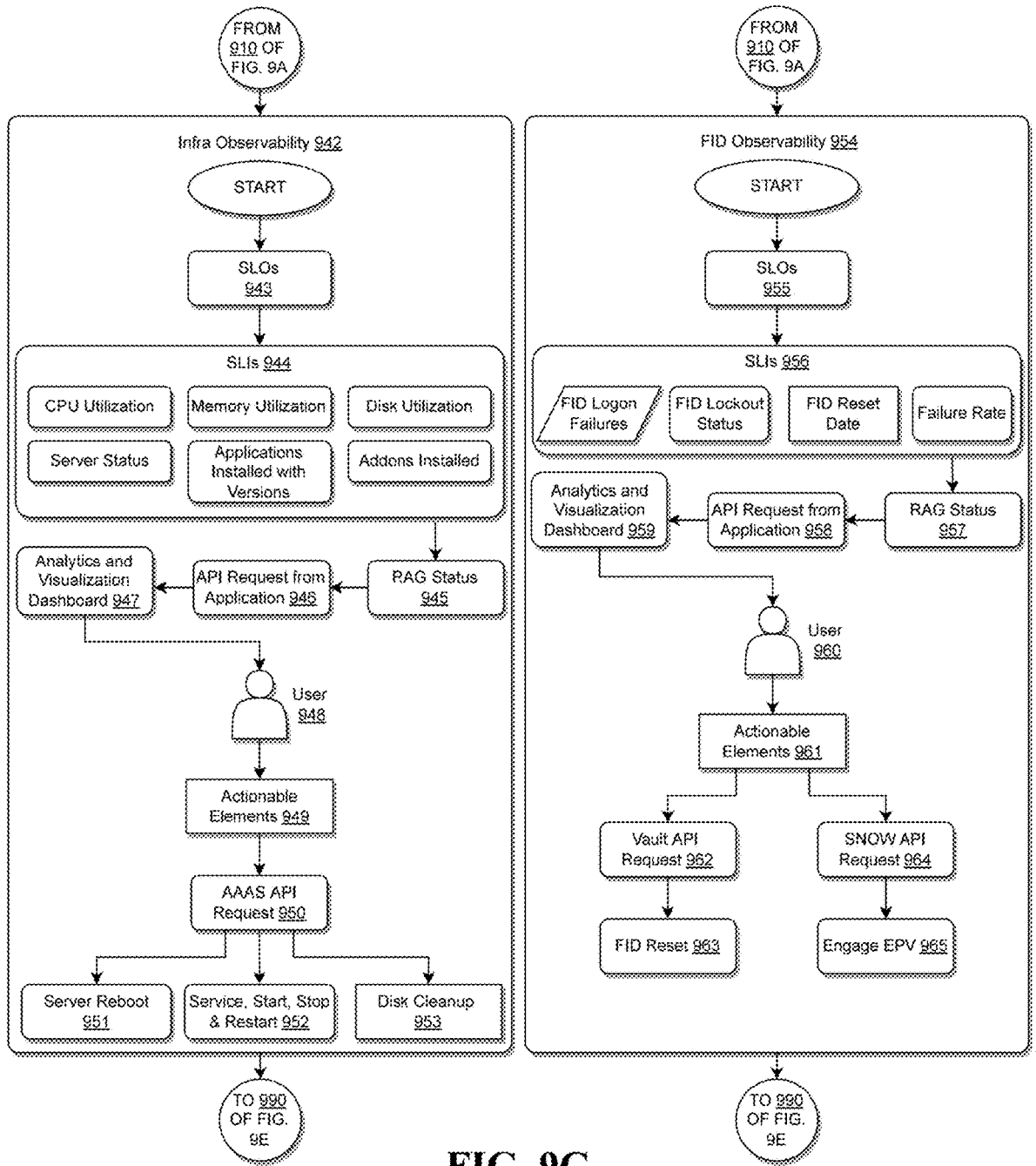

For example, in the infra observability flow 942 illustrated in FIG. 9C, data from SLOs 943 may flow to SLIs 944 which may include data related to CPU utilization, memory utilization, disk utilization, add-ons installed, applications installed with versions, server status, etc., but the disclosure is not limited thereto. Data from the SLIs 944 may flow to RAG status block 945, then to API request from application block 946, and then to analytics and visualization dashboard 947 for user's 948 consumption. User input from user 948 may be received by an actionable elements block 949 from which data may flow to an AAAS API request block 950. The output data from the AAAS API request block 950 may be utilized for server reboot 951, service, start, stop, and restart 952, and disk cleanup 953.

According to exemplary embodiments, the BPMM 406 may be further configured to: automatically generate and display FID metrics data related account health, password sync status, FID login failures with actionable features to trigger password reset on-demand and password management team engagement using service now API, but the disclosure is not limited thereto (see, e.g., FIG. 9C, FID observability flow 954).

For example, in the FID observability flow 954 illustrated in FIG. 9C, data from SLOs 955 may flow to SLIs 956 which may include data related to FID logon failures, FID lockout status, FID reset date, failure rate, etc., but the disclosure is not limited thereto. Data from the SLIs 956 may flow to a RAG status block 957, then to API request from application block 958, and then to analytics and visualization dashboard 959 for user's 960 consumption. User input from user 960 may be received by an actionable elements block 961 from which data may flow to a vault API request block 962 and a SNOW API request block 964. The output data from the vault API request block 962 may be utilized for FID request 963. The output data from the SNOW API request 964 may be utilized for engaging EPV 965.

According to exemplary embodiments, the BPMM 406 may be further configured to: automatically generate and display application level metrics data related to status of applications, APIs, Web-links, latency and failure rate with actionable features to trigger AAAS for application upgrades and application team engagement using service now API.

Figure 9D:
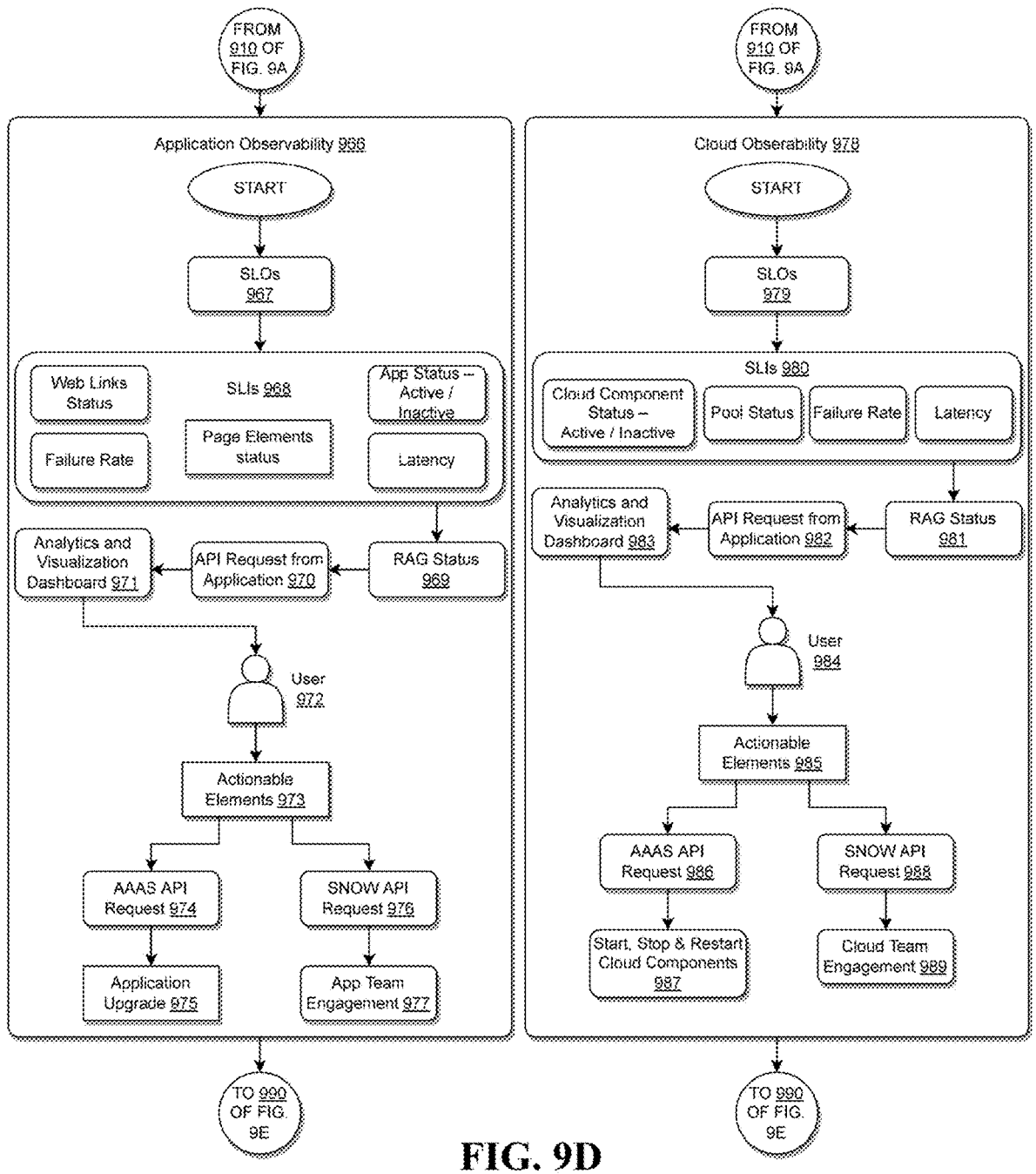

For example, in the application observability flow 966 illustrated in FIG. 9D, data from SLOs 967 may flow to SLIs 968 which may include data related to web links status, application status (e.g., active or inactive), latency, page elements status, failure rate, etc., but the disclosure is not limited thereto. Data from the SLIs 968 may flow to a RAG status block 969, then to API request from application block 970, and then to analytics and visualization dashboard 971 for users 972 consumption. User input from user 972 may be received by an actionable elements block 973 from which data may flow to an AAAS API request block 974 and a SNOW API request block 976. The output data from the AAAS API request block 974 may be utilized for application upgrade 975. The output data from the SNOW API request 976 may be utilized for application team engagement 977.

According to exemplary embodiments, the BPMM 406 may be further configured to: automatically generate and display cloud metrics data related to pool status, cloud components status, performance metrics of the component with actionable features to trigger AAAS for start or stop or restart cloud components and cloud team engagement using service now API.

For example, in the cloud observability flow 978 illustrated in FIG. 9D, data from SLOs 979 may flow to SLIs 980 which may include data related to, cloud component status (e.g., active or inactive), pool status, latency, failure rate, etc., but the disclosure is not limited thereto. Data from the SLIs 980 may flow to a RAG status block 981, then to API request from application block 982, and then to analytics and visualization dashboard 983 for users 984 consumption. User input from user 984 may be received by an actionable elements block 985 from which data may flow to an AAAS API request block 986 and a SNOW API request block 988. The output data from the AAAS API request block 986 may be utilized for start, stop and restart of cloud components 987. The output data from the SNOW API request 988 may be utilized for cloud team engagement 989.

Figure 9E:
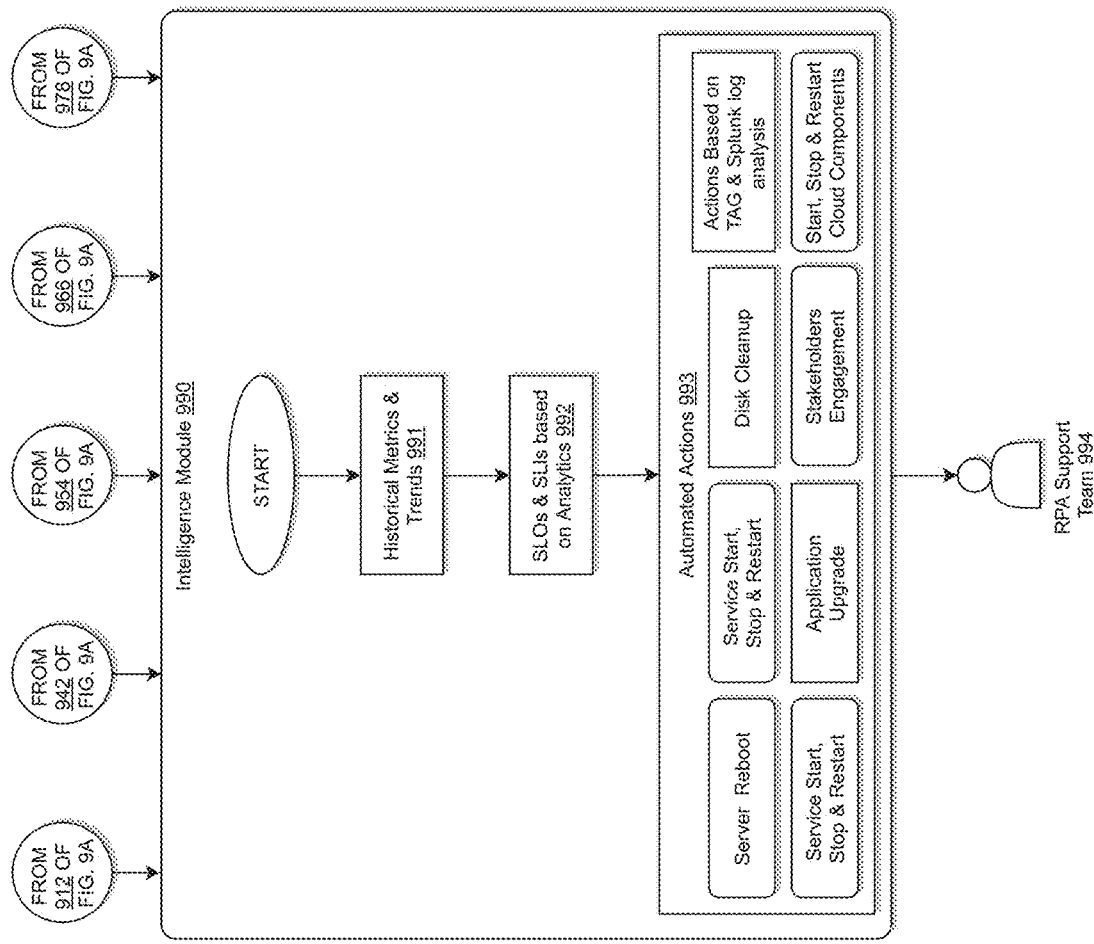

As illustrated in FIG. 9E, output data from the dynamic referring module 912 (FIG. 9B), infra observability flow 942 (FIG. 9C), FID observability flow 954 (FIG. 9C), application observability flow 966 (FIG. 9D), and cloud observability flow 978 (FIG. 9D) may flow to an intelligence module 990 implemented by the BPMM 406 (FIG. 4). In this flow, as illustrated in FIG. 9E, a historical metrics and trends block 991 may receive output data from each of the dynamic referring module 912 (FIG. 9B), infra observability flow 942 (FIG. 9C), FID observability flow 954 (FIG. 9C), application observability flow 966 (FIG. 9D), and cloud observability flow 978 (FIG. 9D). Data from the historical metrics and trends block 991 may flow to an analytics block 992 (i.e., SLOs and SLIs based on analytics). Data from the analytics block 992 may flow to an automated actions block 993 that may be configured for server reboot; service start, stop, and restart; disk cleanup; actions based on log analysis (e.g., TAG and Splunk log analysis, but the disclosure is not limited thereto); start, stop and restart of cloud components; stakeholders engagement; application upgrade, etc., but the disclosure is not limited thereto. Output data from the intelligence module 990 may be sent to an RPA support team 994 for further analysis and taking appropriate remedial actions.

Figure 10:
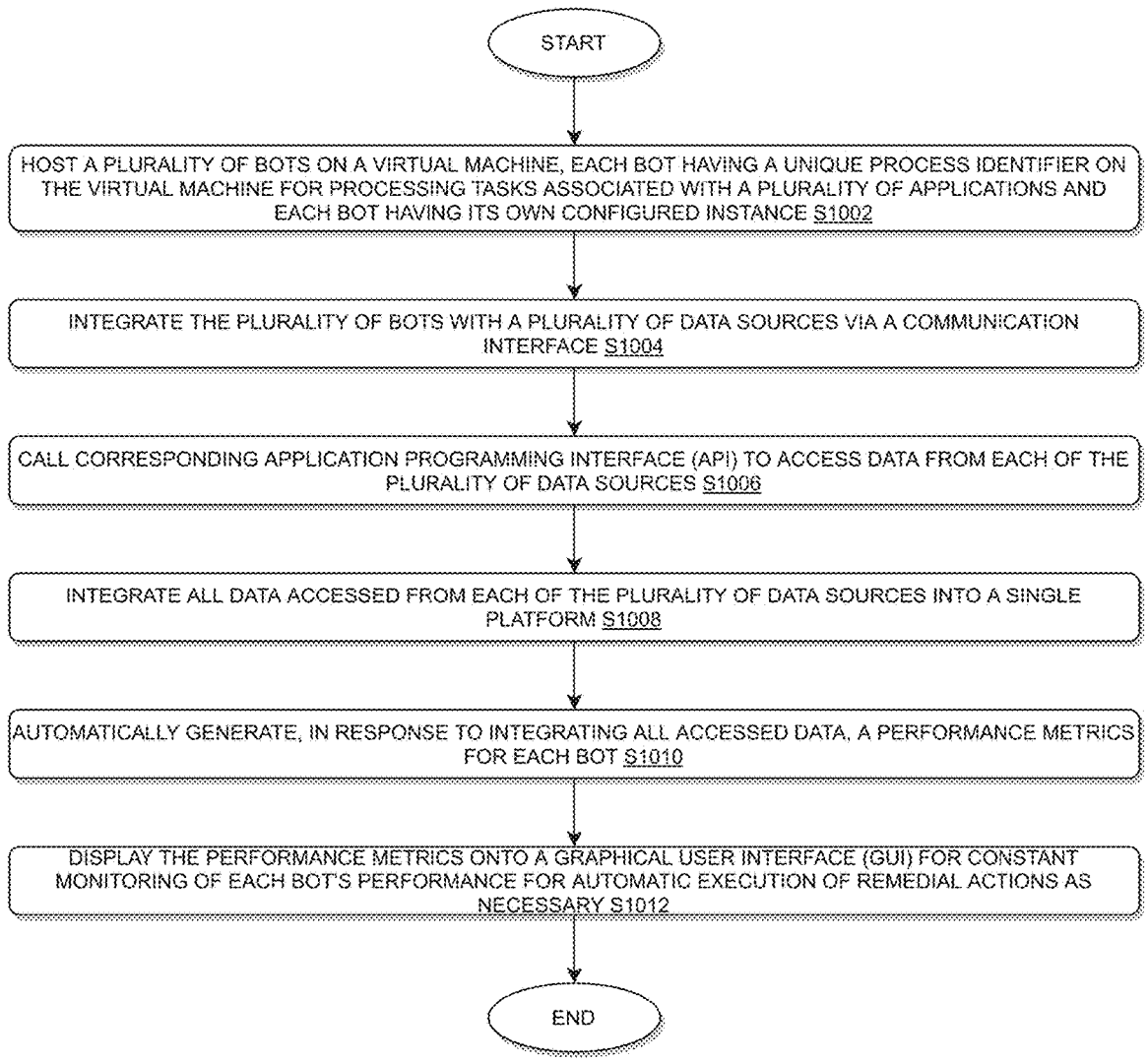
FIG. 10 illustrates a flow chart of a process implemented by high density session management module of FIG. 4 in accordance with an exemplary embodiment.

FIG. 10 illustrates a flow chart of a process 1000 for implementing the BPMM 406 that provides a platform for automatically monitoring performance of multiple bots in accordance with an exemplary embodiment. It will be appreciated that the illustrated process 1000 and associated steps may be performed in a different order, with illustrated steps omitted, with additional steps added, or with a combination of reordered, combined, omitted, or additional steps.

As illustrated in FIG. 10, at step S1002, the process 1000 may include hosting a plurality of bots on a virtual machine, each bot having a unique process identifier on the virtual machine for processing tasks associated with a plurality of applications and each bot having its own configured instance.

At step S1004, the process 1000 may include integrating the plurality of bots with a plurality of data sources via a communication interface.

At step S1006, the process 1000 may include calling corresponding API to access data from each of the plurality of data sources.

At step S1008, the process 1000 may include integrating all data accessed from each of the plurality of data sources into a single platform.

At step S1010, the process 1000 may include automatically generating, in response to integrating all accessed data, a performance metrics for each bot.

At step S1012, the process 1000 may include displaying the performance metrics onto a GUI for constant monitoring of each bot's performance for automatic execution of remedial actions as necessary.

According to exemplary embodiments, the process 1000 may further include: automatically generating and displaying STP data that defines a percentage of volume each bot completed for a given volume in a time period.

According to exemplary embodiments, the process 1000 may further include: automatically generating and displaying an AHT data that defines an average time taken by a certain bot to handle each instance.

According to exemplary embodiments, the process 1000 may further include: hyperlinking each bot to its own live telemetry dashboard where each metric is displayed in graphical and tabular formats with historical information available for troubleshooting purposes.

According to exemplary embodiments, the process 1000 may further include: automatically generating and displaying application level metrics data related to status of applications, APIs, Web-links, latency and failure rate with actionable features to trigger AAAS for application upgrades and application team engagement using service now API.

According to exemplary embodiments, the process 1000 may further include: automatically generating and displaying cloud metrics data related to pool status, cloud components status, performance metrics of the component with actionable features to trigger AAAS for start or stop or restart cloud components and cloud team engagement using service now API.

According to exemplary embodiments, the process 1000 may further include: automatically generating and displaying FID metrics data related account health, password sync status, FID login failures with actionable features to trigger password reset on-demand and password management team engagement using service now API.

According to exemplary embodiments, the BPMD 402 may include a memory (e.g., a memory 106 as illustrated in FIG. 1) which may be a non-transitory computer readable medium that may be configured to store instructions for implementing the BPMM 406 that provides a platform for automatically monitoring performance of multiple bots as disclosed herein. The BPMD 402 may also include a medium reader (e.g., a medium reader 112 as illustrated in FIG. 1) which may be configured to read any one or more sets of instructions, e.g., software, from any of the memories described herein. The instructions, when executed by a processor embedded within the BPMM 406, or within the BPMD 402, may be used to perform one or more of the methods and processes as described herein. In a particular embodiment, the instructions may reside completely, or at least partially, within the memory 106, the medium reader 112, and/or the processor 104 (see FIG. 1) during execution by the BPMD 402.

According to exemplary embodiments, the instructions, when executed, may cause a processor embedded within the BPMM 406 or the BPMD 402 to perform the following: hosting a plurality of bots on a virtual machine, each bot having a unique process identifier on the virtual machine for processing tasks associated with a plurality of applications and each bot having its own configured instance; integrating the plurality of bots with a plurality of data sources via a communication interface; calling corresponding application programming interface (API) to access data from each of the plurality of data sources; integrating all data accessed from each of the plurality of data sources into a single platform; automatically generating, in response to integrating all accessed data, a performance metrics for each bot; and displaying the performance metrics onto a graphical user interface (GUI) for constant monitoring of each bot's performance for automatic execution of remedial actions as necessary. The processor may be the same or similar to the processor 104 as illustrated in FIG. 1 or the processor embedded within BPMD 202, BPMD 302, BPMD 402, and the BPMM 406.

According to exemplary embodiments, the instructions, when executed, may cause the processor 104 to further perform the following: automatically generating and displaying STP data that defines a percentage of volume each bot completed for a given volume in a time period.

According to exemplary embodiments, the instructions, when executed, may cause the processor 104 to further perform the following: automatically generating and displaying an AHT data that defines an average time taken by a certain bot to handle each instance.

According to exemplary embodiments, the instructions, when executed, may cause the processor 104 to further perform the following: hyperlinking each bot to its own live telemetry dashboard where each metric is displayed in graphical and tabular formats with historical information available for troubleshooting purposes.

According to exemplary embodiments, the instructions, when executed, may cause the processor 104 to further perform the following: automatically generating and displaying application level metrics data related to status of applications, APIs, Web-links, latency and failure rate with actionable features to trigger AAAS for application upgrades and application team engagement using service now API.

According to exemplary embodiments, the instructions, when executed, may cause the processor 104 to further perform the following: automatically generating and displaying cloud metrics data related to pool status, cloud components status, performance metrics of the component with actionable features to trigger AAAS for start or stop or restart cloud components and cloud team engagement using service now API.

According to exemplary embodiments, the instructions, when executed, may cause the processor 104 to further perform the following: automatically generating and displaying FID metrics data related account health, password sync status, FID login failures with actionable features to trigger password reset on-demand and password management team engagement using service now API.

According to exemplary embodiments as disclosed above in FIGS. 1-10, technical improvements effected by the instant disclosure may include a platform for implementing a platform and language agnostic bots' performance monitoring module configured with live telemetry features for providing detailed view of metrics with which performance of each bot could be easily assessed, but the disclosure is not limited thereto.

For example, according to exemplary embodiments as disclosed above in FIGS. 1-10, technical improvements effected by the instant disclosure may include a platform for implementing a platform and language agnostic bots' performance monitoring module that may be configured to provide a single platform (e.g., performing as a one stop solution) to monitor the following metrics: bot metrics related to, e.g., STP, AHT, active vs. configured instances, volume processed, data loading, etc.; infra metrics related to, e.g., CPU, memory, disk utilization, applications installed with versions with actionable features to trigger AAAS for start or stop or restart of services, reboot OS, disk cleanup, etc.; FID related metrics, e.g., account health, password sync status, FID login failures with actionable features to trigger password reset on-demand and password management team engagement using SNOW API, etc.; application level monitoring, e.g., status of applications, APIs, Web-links, latency and failure rate with actionable features to trigger AAAS for application upgrades and application team engagement using SNOW API, etc.; cloud metrics monitoring, e.g., pool status, cloud components status, performance metrics of the component with actionable features to trigger AAAS for start or stop or restart cloud components and cloud team engagement using SNOW API, etc., but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically monitoring performance of multiple software robots (bots) by utilizing one or more processors and one or more memories, the method comprising:
hosting a plurality of bots on a virtual machine, each bot having a unique process identifier on the virtual machine for processing tasks associated with a plurality of applications and each bot having its own configured instance;
integrating the plurality of bots with a plurality of data sources via a communication interface;
calling corresponding application programming interface (API) to access data from each of the plurality of data sources, wherein the plurality of data sources include a data source for obtaining robotic process automation (RPA) data; a data source for obtaining information data related to exact location of a server that hosts a certain bot; a data source for obtaining infra metrics data; a data source for obtaining data related to what kind data feed each bot is receiving;
an active directory to obtain data related to status of each data feed; a data source for obtaining log data associated with data processed by each bot; and data source for obtaining cloud components associated with each bot;
integrating all data accessed from each of the plurality of data sources into a single platform;
automatically generating, in response to integrating all accessed data, a performance metrics for each bot;
displaying the performance metrics onto a graphical user interface (GUI) for constant monitoring of each bot's performance for automatic execution of remedial actions as necessary; and
automatically generating and displaying cloud metrics data related to pool status, cloud components status, performance metrics of the component with actionable features to trigger AAAS for start or stop or restart cloud components and cloud team engagement using service now API.

2. The method according to claim 1, wherein the virtual machine is a server or a database, and wherein each bot shares a common database.

3. The method according to claim 1, wherein infra metrics data include one or more of the following data: CPU capacity, memory capacity, disk utilization, applications installed with versions with actionable features to trigger automation-as-a-service (AAAS) for start or stop or restart of services, reboot operating system (OS) and disk cleanup.

4. The method according to claim 1, further comprising:
automatically generating and displaying straight-through processing (STP) data that defines a percentage of volume each bot completed for a given volume in a time period.

5. The method according to claim 1, further comprising:
automatically generating and displaying an average handle time (AHT) data that defines an average time taken by a certain bot to handle each instance.

6. The method according to claim 1, further comprising:
hyperlinking each bot to its own live telemetry dashboard where each metric is displayed in graphical and tabular formats with historical information available for troubleshooting purposes.

7. The method according to claim 1, further comprising:
automatically generating and displaying application level metrics data related to status of applications, APIs, Web-links, latency and failure rate with actionable features to trigger AAAS for application upgrades and application team engagement using the service now API.

8. The method according to claim 1, further comprising:
automatically generating and displaying functional identifier (FID) metrics data related account health, password sync status, FID login failures with actionable features to trigger password reset on-demand and password management team engagement using the service now API.

9. A system for automatically monitoring performance of multiple software robots (bots), the system comprising:
a processor; and
a memory operatively connected to the processor via a communication interface, the memory storing computer readable instructions, when executed, causes the processor to:
host a plurality of bots on a virtual machine, each bot having a unique process identifier on the virtual machine for processing tasks associated with a plurality of applications and each bot having its own configured instance;
integrate the plurality of bots with a plurality of data sources via a communication interface;
call corresponding application programming interface (API) to access data from each of the plurality of data sources, wherein the plurality of data sources include a data source for obtaining robotic process automation (RPA) data; a data source for obtaining information data related to exact location of a server that hosts a certain bot; a data source for obtaining infra metrics data; a data source for obtaining data related to what kind data feed each bot is receiving; an active directory to obtain data related to status of each data feed; a data source for obtaining log data associated with data processed by each bot; and data source for obtaining cloud components associated with each bot;
integrate all data accessed from each of the plurality of data sources into a single platform;
automatically generate, in response to integrating all accessed data, a performance metrics for each bot;
display the performance metrics onto a graphical user interface (GUI) for constant monitoring of each bot's performance for automatic execution of remedial actions as necessary; and
automatically generate and display cloud metrics data related to pool status, cloud components status, performance metrics of the component with actionable features to trigger AAAS for start or stop or restart cloud components and cloud team engagement using service now API.

10. The system according to claim 9, wherein the virtual machine is a server or a database, and wherein each bot shares a common database.

11. The system according to claim 10, wherein infra metrics data include one or more of the following data: CPU capacity, memory capacity, disk utilization, applications installed with versions with actionable features to trigger automation-as-a-service (AAAS) for start or stop or restart of services, reboot operating system (OS) and disk cleanup.

12. The system according to claim 9, wherein the processor is further configured to:
automatically generate and display straight-through processing (STP) data that defines a percentage of volume each bot completed for a given volume in a time period.

13. The system according to claim 9, wherein the processor is further configured to:
automatically generate and display an average handle time (AHT) data that defines an average time taken by a certain bot to handle each instance.

14. The system according to claim 9, wherein the processor is further configured to:
hyperlink each bot to its own live telemetry dashboard where each metric is displayed in graphical and tabular formats with historical information available for troubleshooting purposes.

15. The system according to claim 9, wherein the processor is further configured to:
automatically generate and display application level metrics data related to status of applications, APIs, Weblinks, latency and failure rate with actionable features to trigger AAAS for application upgrades and application team engagement using the service now API.

16. The system according to claim 9, wherein the processor is further configured to:
automatically generate and display functional identifier (FID) metrics data related account health, password sync status, FID login failures with actionable features to trigger password reset on-demand and password management team engagement using the service now API.

17. A non-transitory computer readable medium configured to store instructions for automatically monitoring performance of multiple software robots (bots), wherein, when executed, the instructions cause a processor to perform the following:
hosting a plurality of bots on a virtual machine, each bot having a unique process identifier on the virtual machine for processing tasks associated with a plurality of applications and each bot having its own configured instance;
integrating the plurality of bots with a plurality of data sources via a communication interface;
calling corresponding application programming interface (API) to access data from each of the plurality of data sources, wherein the plurality of data sources include a data source for obtaining robotic process automation (RPA) data; a data source for obtaining information data related to exact location of a server that hosts a certain bot; a data source for obtaining infra metrics data; a data source for obtaining data related to what kind data feed each bot is receiving;
an active directory to obtain data related to status of each data feed; a data source for obtaining log data associated with data processed by each bot; and data source for obtaining cloud components associated with each bot;
integrating all data accessed from each of the plurality of data sources into a single platform;
automatically generating, in response to integrating all accessed data, a performance metrics for each bot;
displaying the performance metrics onto a graphical user interface (GUI) for constant monitoring of each bot's performance for automatic execution of remedial actions as necessary; and
automatically generating and displaying cloud metrics data related to pool status, cloud components status, performance metrics of the component with actionable features to trigger AAAS for start or stop or restart cloud components and cloud team engagement using service now API.

* * * * *